US010459732B2

(12) United States Patent
  Pitu

(10) Patent No.: US 10,459,732 B2
(45) Date of Patent: Oct. 29, 2019

(54) METHOD FOR OPERATING A SYSTEM ON CHIP COMPRISING A BOOTABLE PROCESSOR TO PROVIDE PROTECTION OF CONFIDENTIAL INFORMATION ON THE SYSTEM ON CHIP

(71) Applicant: Siemens Aktiengesellschaft, Munich (DE)

(72) Inventor: Ciprian-Leonard Pitu, Brasov (RO)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 15/543,629

(22) PCT Filed: Jan. 14, 2016

(86) PCT No.: PCT/EP2016/050675
  § 371 (c)(1),
  (2) Date: Jul. 14, 2017

(87) PCT Pub. No.: WO2016/113354
  PCT Pub. Date: Jul. 21, 2016

(65) Prior Publication Data
  US 2018/0329714 A1   Nov. 15, 2018

(30) Foreign Application Priority Data
  Jan. 15, 2015   (EP) .................................... 15464003

(51) Int. Cl.
  *G06F 9/44*    (2018.01)
  *G06F 9/4401*  (2018.01)
  (Continued)

(52) U.S. Cl.
  CPC .............. *G06F 9/4401* (2013.01); *G06F 1/24* (2013.01); *G06F 21/575* (2013.01); *G06F 21/81* (2013.01);
  (Continued)

(58) Field of Classification Search
  None
  See application file for complete search history.

(56) References Cited

U.S. PATENT DOCUMENTS

2006/0272027 A1* 11/2006 Noble ................. G06F 12/1408
                                                       726/27
2008/0195787 A1*  8/2008 Geiger ............... G06F 13/4072
                                                       710/302

(Continued)

FOREIGN PATENT DOCUMENTS

WO   WO2012/099657   7/2012

*Primary Examiner* — Danny Chan
(74) *Attorney, Agent, or Firm* — Cozen O'Connor

(57) ABSTRACT

A method for operating a system on chip (SoC) comprising a bootable processor, wherein the method includes executing a bootloader and measuring electrical power consumed by the processor during booting to derive a unique power characteristic data, verifying the unique power characteristic data, and reconstructing an device key from the unique power characteristic data and helper dater derived during an enrollment of the system on chip, where the measured power trace of the processor constitutes a unique signature of the SoC device executing specified software such that the solution secures the running software by itself.

16 Claims, 3 Drawing Sheets

(51) Int. Cl.
*G06F 21/57* (2013.01)
*G06F 21/81* (2013.01)
*H04L 29/06* (2006.01)
*G09C 1/00* (2006.01)
*H04L 9/08* (2006.01)
*H04L 9/32* (2006.01)
*G06F 1/24* (2006.01)

(52) U.S. Cl.
CPC .............. *G09C 1/00* (2013.01); *H04L 9/0866* (2013.01); *H04L 9/0894* (2013.01); *H04L 9/3234* (2013.01); *H04L 63/06* (2013.01); *G06F 2221/033* (2013.01); *G06F 2221/2107* (2013.01); *G06F 2221/2143* (2013.01); *H04L 2463/081* (2013.01)

(56) References Cited

U.S. PATENT DOCUMENTS

| | | | |
|---|---|---|---|
| 2009/0304101 A1* | 12/2009 | LoPorto | G01D 4/004 375/260 |
| 2012/0278014 A1* | 11/2012 | Davies | G01D 4/00 702/61 |
| 2013/0019105 A1 | 1/2013 | Hussain | |
| 2013/0080755 A1 | 3/2013 | Lin et al. | |
| 2014/0013425 A1* | 1/2014 | Samson | G06F 21/755 726/22 |
| 2015/0301109 A1* | 10/2015 | O'Flynn | G01R 31/3191 324/750.02 |
| 2016/0103994 A1* | 4/2016 | Murakami | G06F 21/572 713/193 |
| 2017/0185770 A1* | 6/2017 | Guri | G06F 21/575 |

* cited by examiner

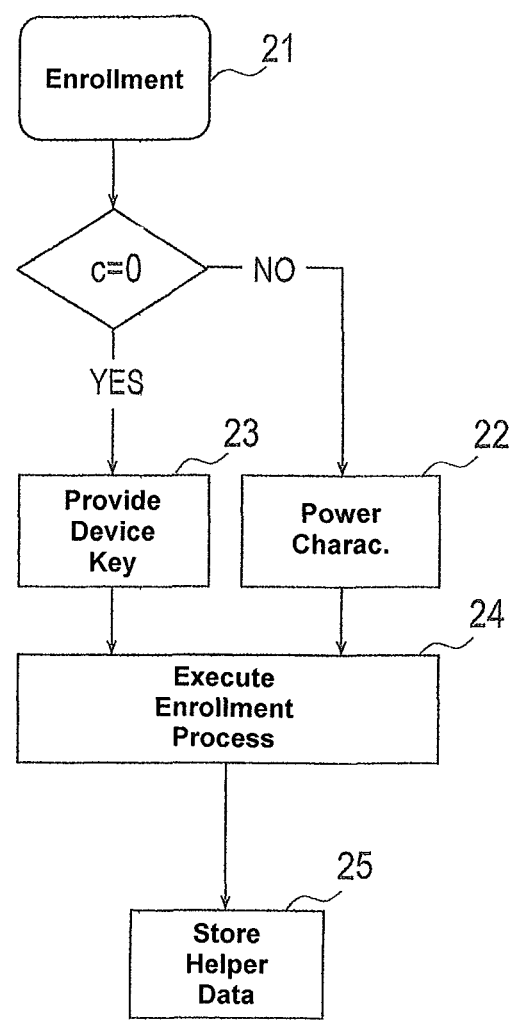

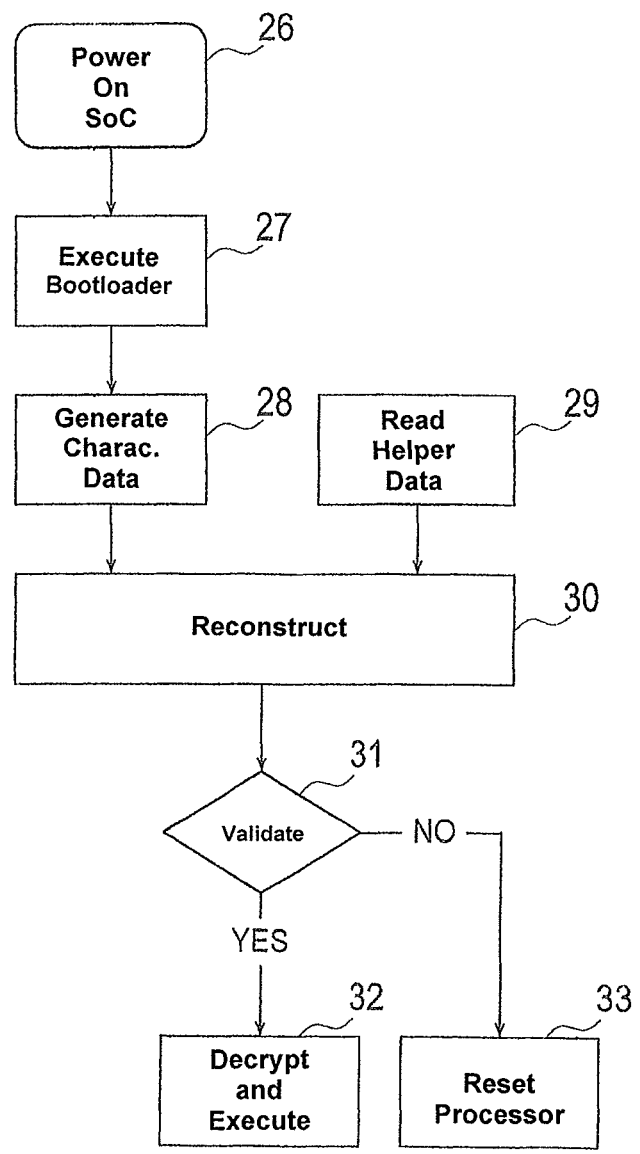

METHOD FOR OPERATING A SYSTEM ON CHIP COMPRISING A BOOTABLE PROCESSOR TO PROVIDE PROTECTION OF CONFIDENTIAL INFORMATION ON THE SYSTEM ON CHIP

CROSS-REFERENCE TO RELATED APPLICATIONS

This is a U.S. national stage of application No. PCT/EP2016/050675 filed 14 Jan. 2016, and claims priority to European application No. 15464003 filed Jan. 15, 2015, the content of which is incorporated herein by reference in its entirety.

BACKGROUND OF THE INVENTION

1. Field of the Invention

The invention relates to a method for operating a system on chip comprising a bootable processor, and also relates to a system on chip for implementing the method.

2. Description of the Related Art

A system on chip (SoC) is an integrated circuit that integrates components of a computer or other electronic system into a single chip. Such chips can be subject to attacks during which original software is replaced or changed.

Currently there are different approaches for securing memory content. A well known solution for achieving this is data encryption, where the memory's content is encrypted and cannot be decrypted without the correct key. The same key is used to encrypt any firmware loaded on-chip. If the key leaks or if the SoC's storage is read out, then this type of protection becomes obsolete.

WO 2012/099657 A2 relates to intrinsic security, which relies on physical features of a silicon device. These features are used to uniquely characterise the device. By using this method, the manufacturing imperfections are exploited, which yields a device-unique identification characteristic that can be used to derive a cryptographic key. This solution is highly secure, but requires extensive engineering and resources.

SUMMARY OF THE INVENTION

In view of the foregoing, it is an object of the present invention to provide an improved method for protecting confidential information on a system on chip.

This and other objects and advantages are achieved in accordance with the invention by a method for operating a system on chip comprising a bootable processor, where the method comprisesexecuting a bootloader and measuring electrical power consumed by the processor during booting in order to derive a unique power characteristic data, verifying the unique power characteristic data, and reconstructing a device key from the unique power characteristic data and helper dater derived during an enrollment of the system on chip.

The measured power trace of the processor constitutes a unique signature of the SoC device executing specified software. Thus, the solution secures the running software by itself. There are no on-chip stored secrets. From the helper data alone, there is no possibility to compute the device key, i.e., the encryption key, or the power characteristics.

An improved method further comprises, subsequent to the reconstruction of the device key, decrypting software, which is encrypted with the device key and stored on memory, and executing the decrypted software. Thus, the method is used to characterise preloaded software on a SoC device.

In a preferred embodiment of the method, the verification of the unique power characteristic data is performed by comparing a check sum of the derived power characteristic data to a check sum generated during enrolment of the system on chip. This validation of the power characteristics instantly reveals any interference of the bootloader that has occurred.

In case of falsification, a reset signal is generated to reset the processor. Thus, an attack stops before memory data can be read out.

Furthermore, it is advantageous, if the bootloader is re-executed after reset of the processor for a determined number of repetitions. In case of a singular problem, this measure allows normal operation of the SoC after an automatic restart.

If a problem endures, it is advantageous, if the SoC is blocked after executing the determined number of repetitions. Thus, no further manipulations, respectively, attacks are possible.

As an optional measure, a security alarm is reported after executing the determined number of repetitions. Additionally, for a high risk application it is advantageous, if the memory of the SoC is erased after executing the determined number of repetitions. This prevents any type of unauthorised access to secure data.

During enrolment of the SoC, booting is preferably executed in a loop to obtain a number of samples of the measured electrical power consumed by the processor. This data collection allows a better verification of the power characteristic data (e.g., after enrolment).

It is also an object of the invention to provide a system on chip which is configured to implement the methods in accordance with the disclosed embodiments, where the system on chip comprises a processor unit, which comprises a processor as such an ADC for converting a measured power trace into digital data, a power characterisation module for generating a power characteristic data from the power trace digital data, an enrolment module, a storage to store helper data and validation data, which is particularly a check sum of the power data, and a trace validator and key reconstructor module.

By adding basic hardware components, inaccessible for the end-users, the software executing on the SoC is characterised by the power trace. The analog-to-digital converter (ADC) and the power characterisation module achieve a fast and easy enrollment and reconstruction of the power characteristics. The boot process is not hindered or slowed down as the power characteristics are generated in parallel with the bootloader being executed.

In a specific embodiment, the processor unit is connected to a system bus, a clock and reset unit and a memory controller.

Furthermore, the enrolment module is physically disabled subsequent to the generation of the helper data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

These and other aspects and advantages will become more apparent and more readily appreciated from the following description of the exemplary embodiments, taken in conjunction with the accompanying drawings, in which:

FIG. 3 is a flowchart of an enrollment process in accordance with the invention; and FIG. 4 is a flowchart of a reconstruction process in accordance with the invention.

DETAILED DESCRIPTION OF THE EXEMPLARY EMBODIMENTS

Figure 1:
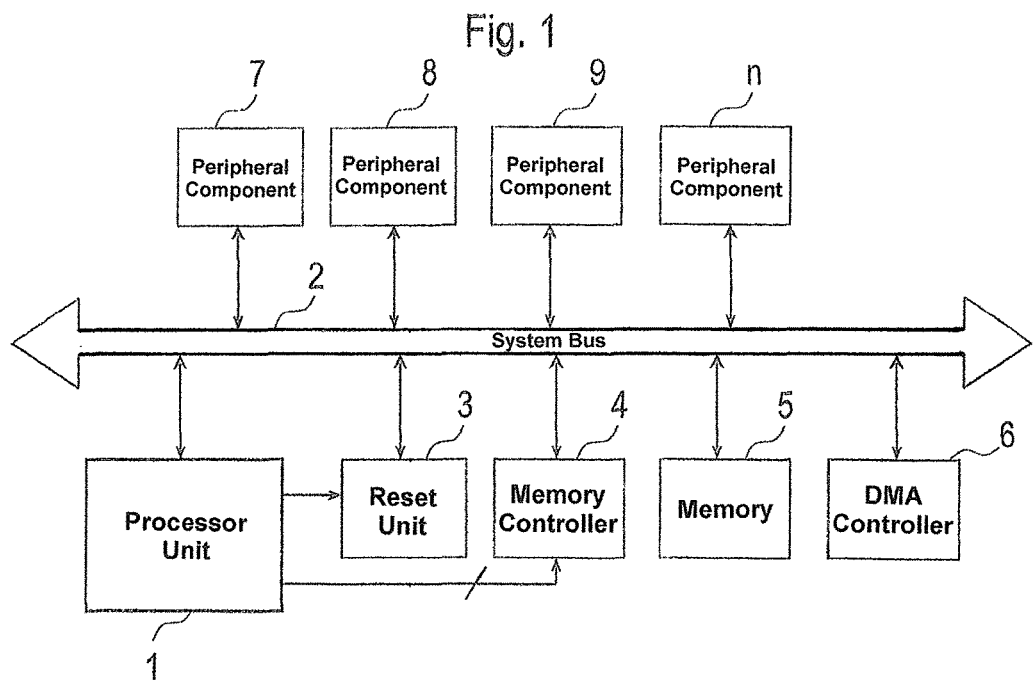
FIG. 1 is a SoC device structure in accordance with the invention.

FIG. 1 shows a System on Chip (SoC) device with a processor unit 1, which is connected to a system bus 2. Additionally, a clock and reset unit 3 and a memory controller 4 are connected to the processor unit 1 and the system bus 2. Further components of the SoC are a memory 5, a DMA controller 6 and diverse peripheral components 7, 8, 9 . . . n, which are also connected to the system bus 2.

Figure 2:
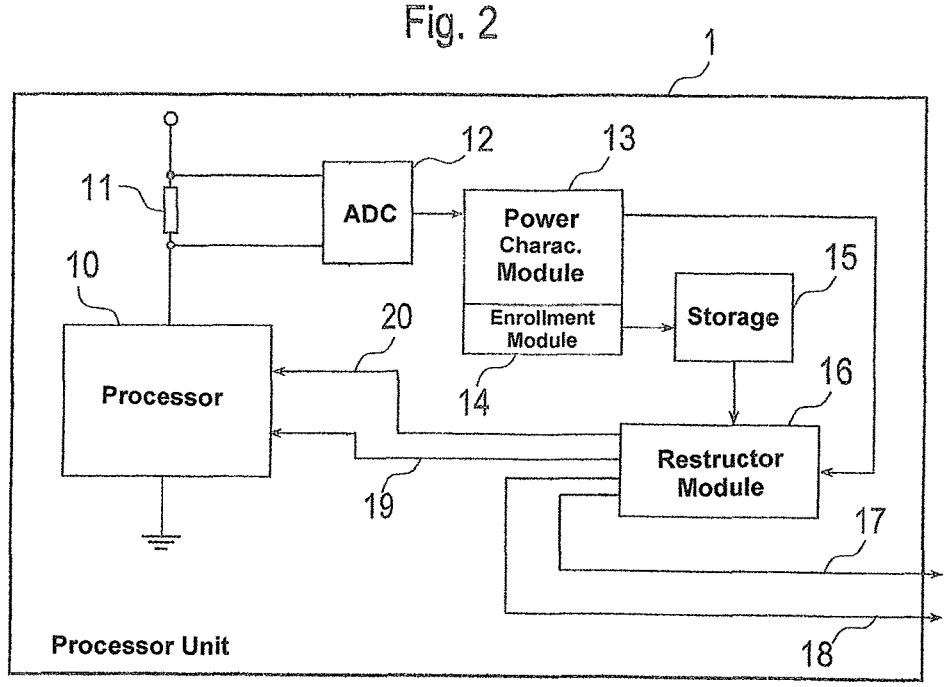
FIG. 2 is a processor unit of FIG. 1.

The processor unit 1 is shown in detail in FIG. 2. The processor unit 1 comprises the processor 10 as such, which is connected to a power source via a shunt resistance 11. The voltage drop at the shunt resistance 11 is measured by an ADC 12, which converts the measured power trace into digital data. The ADC measures only the power consumption of the processor 10.

Furthermore, a power characterisation module 13 generates power characteristic data out of the power trace digital data. Thus, the power characterisation module 13 evaluates the power trace and determines a chip-unique pattern, which reflects the executed software and the physical characteristics of the particular device that is executing the software.

Attached to the power characterisation module 13 is an enrollment module 14 that is used during the enrolment phase. The enrollment module 14 generates helper data, using the power characterisation data and an encryption key provided by the manufacturer. The helper data is stored in a non-volatile storage 15.

For the reconstruction phase, a trace validator and key reconstructor module 16 is arranged in the processor unit 1. The reconstructor module 16 receives the power characterisation data from the power characterisation module 13 and reads the stored helper data to reconstruct the original key.

If the power characterisation data is valid, then the trace validator and key reconstructor module 16 sends a system-validate-signal 17 to the clock and reset module 3 and the reconstructed device key 18 to the memory controller 4. Additionally, an execution-enable-signal 19 is sent to the processor 10.

In cases of a falsification, the trace validator and key reconstructor module 16 sends a reset-signal 20 to the processor 10. For this purpose, check sum verification is performed.

During enrollment, which is shown in FIG. 3, the manufacturer of the SoC or a software developer loads the bootloader on-chip. Enrollment (step 21) starts with triggering the enrollment module 14. As a result, the processor 10 executes the bootloader in a loop. For this purpose, a counter c is used. Each time the bootloader is executed, power characterisation (step 22) occurs. Power trace is measured by the ADC 12 and processed by the power characterisation module 13.

At the end of the enrollment phase, when the enrollment counter c is equal to zero, the enrollment module 14 executes the enrollment process 24 as such. The averaged power characteristic data and a provided device key (step 23) are used to generate the helper data. Storing (step 25) of the helper data is the last step before the enrollment module 14 (see FIG. 2) is disabled physically.

Normal operation is shown in FIG. 4. The SoC is powered on and reconstruction (step 26) starts with the execution (step 27) of the bootloader. The boot process is the first step in starting a silicon device and is executed directly after power-on. The boot process initializes the SoC into a predefined state, allowing the SoC to further load more complex software. Therefore, the first security problem is the bootloader. If the bootloader gets compromised, then the pyramid of trust cannot be set up.

The ADC 12 (see FIG. 2) measures the power trace and the power characterisation module 13 (see FIG. 2) generates the power characteristic data. Parallel to this generation (step 28) of the power characteristic data the reading (step 29) of the helper data is performed. During the reconstruction process (step 30) as such, the trace validator and key reconstructor module 16 (see FIG. 2) uses the power characteristics and the helper data to validate the executed bootloader and to generate the device key. The validation (step 31) either results in decrypting and executing (step 32) software or in resetting (step 33) of the processor 10 (see FIG. 2).

If the power characteristics data is valid, then the execution of the software is also validated by using the power characteristics and the helper data, respectively, the device key.

In case of a mismatch, due to security attacks (e.g., changed bootloader, or changed instruction or code sequences inside the original bootloader), the trace validator and key reconstructor module 16 (see FIG. 2) resets the processor 10 and re-executes the bootloader.

After a number of unsuccessful bootloader executions different actions take place, depending on the desired strategy. These actions could be preventing the SoC from starting up, reporting security alarms, or erasing the entire memory.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of operating a system on chip comprising a bootable processor, the method comprising:

executing a bootloader and measuring electrical power consumed by the bootable processor during booting to derive unique power characteristic data;

verifying the unique power characteristic data; and reconstructing a device key from the unique power characteristic data and helper data derived during an enrollment of the system on chip initiated by a developer or manufacturer of the system on chip;

wherein if the unique power characteristic data is valid:
 decrypting software with the device key, said software being previously encrypted with the device key and stored in memory; and
 executing the decrypted software;

wherein if the unique power characteristic data is invalid:
 determine a falsification has occurred and resetting the processor.

2. The method according to claim 1, wherein verification of the unique power characteristic data is performed by comparing a check sum of the derived power characteristic data to a check sum generated during the enrollment of the system on chip.

3. The method according to claim 1, wherein verification of the unique power characteristic data is performed by comparing a check sum of the derived power characteristic data to a check sum generated during the enrollment of the system on chip.

4. The method according to claim 2, wherein a reset signal is generated to reset the processor in cases of the falsification.

5. The method according to claim 4, wherein the bootloader is re-executed after reset of the processor for a determined number of repetitions.

6. The method according to claim 5, wherein the system on chip is blocked after executing the determined number of repetitions.

7. The method according to claim 5, wherein a security alarm is reported after executing the determined number of repetitions.

8. The method according to claim 6, wherein a security alarm is reported after executing the determined number of repetitions.

9. The method according to claim 5, wherein the memory of the system on chip is erased after executing the determined number of repetitions.

10. The method according to claim 6, wherein the memory of the system on chip is erased after executing the determined number of repetitions.

11. The method according to claim 7, wherein the memory of the system on chip is erased after executing the determined number of repetitions.

12. The method according to claim 1, wherein during the enrollment of the system on chip booting is executed in a loop to obtain a number of samples of the measured electrical power consumed by the processor.

13. A system on chip, comprising:
 a processor unit comprising:
  a processor;
  an ADC for converting a measured power trace into power trace digital data;
  a power characterizer which generates power characteristic data from the power trace digital data;
  an enrollment module;
  a storage to store helper data and validation data comprising a check sum of the power characteristic data; and
  a trace validator and key reconstructor module;
 wherein the processor unit is configured to:
  execute a bootloader and measure electrical power consumed by the bootable processor during booting to derive a unique power characteristic data;
  verify the unique power characteristic data; and
  reconstruct a device key based on the unique power characteristic data and helper data derived during an enrollment of the system on chip initiated by a developer or manufacturer of the system on chip;
 wherein if the unique power characteristic data is valid:
  decrypt software with the device key, said software being previously encrypted with the device key and stored in the storage; and
  execute said decrypted software;
 wherein if the unique power characteristic data is invalid:
  determine a falsification has occurred and reset the processor.

14. The system on chip according to claim 13, wherein the processor unit is connected to a system bus, a clock and reset unit and a memory controller.

15. The system on chip according to claim 13, wherein the enrollment module is physically disabled subsequent to the generation of the helper data.

16. The system on chip according to claim 14, wherein the enrollment module is physically disabled subsequent to the generation of the helper data.

* * * * *